United States Patent
Ninomiya et al.

(10) Patent No.: US 10,765,941 B2
(45) Date of Patent: Sep. 8, 2020

(54) DATA EXCHANGE SYSTEM, INFORMATION PROCESSING APPARATUS, STORAGE MEDIUM AND DATA EXCHANGE METHOD

(71) Applicant: NINTENDO CO., LTD., Kyoto (JP)

(72) Inventors: Kei Ninomiya, Kyoto (JP); Akira Kinashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 437 days.

(21) Appl. No.: 15/193,446

(22) Filed: Jun. 27, 2016

(65) Prior Publication Data

US 2017/0173462 A1 Jun. 22, 2017

(30) Foreign Application Priority Data

Dec. 22, 2015 (JP) ................. 2015-249979

(51) Int. Cl.
*A63F 13/35* (2014.01)
*A63F 13/63* (2014.01)
*A63F 13/537* (2014.01)

(52) U.S. Cl.
CPC ............ *A63F 13/35* (2014.09); *A63F 13/537* (2014.09); *A63F 13/63* (2014.09)

(58) Field of Classification Search
CPC ......... A63F 13/35; A63F 13/63; A63F 13/537
See application file for complete search history.

(56) References Cited

U.S. PATENT DOCUMENTS 9,186,586 B2 * 11/2015 Iwamoto ................ H04W 4/60
2009/0328218 A1 * 12/2009 Tsurukawa ............. G06F 21/64
726/23

(Continued)

FOREIGN PATENT DOCUMENTS

JP 2004-166819 6/2004
JP 2010-115231 5/2010

(Continued)

OTHER PUBLICATIONS

English-language machine translation of JP2010-115231.
English-language machine translation of JP2014-090905.
English-language machine translation of JP2015-075853.

*Primary Examiner* — Jason Skaarup
(74) *Attorney, Agent, or Firm* — Nixon & Vanderhye, P.C.

(57) ABSTRACT

A non-limiting example communication game system comprises at least two game apparatuses, and the two game apparatuses communicate with each other directly or via an internet according to instructions of a player. At this time, one of the two game apparatuses functions as a parent apparatus and the other of the two game apparatuses functions as a child apparatus. If both players instruct to exchange characters, character data are sent and received between the parent apparatus and the child apparatus. When a rarity of a character X that is to be sent on exchange is lower than a rarity of a character Y that is to be received by exchange, the parent apparatus receives a notification of writing start from the child apparatus, and performs save writing. On the other hand, when a rarity of a character X that is to be sent on exchange is higher than a rarity of a character Y that is to be received by exchange, the parent apparatus transmits a notification of writing start to the child apparatus, and performs save writing.

12 Claims, 9 Drawing Sheets

(56) References Cited

U.S. PATENT DOCUMENTS

| | | | | |
|---|---|---|---|---|
| 2010/0075759 | A1* | 3/2010 | Kawabata | A63F 13/12 463/42 |
| 2013/0281185 | A1* | 10/2013 | Masuda | A63F 13/10 463/23 |
| 2013/0337906 | A1* | 12/2013 | Ikeda | A63F 13/69 463/29 |
| 2014/0032639 | A1* | 1/2014 | Trousdell | A63F 13/65 709/203 |
| 2014/0073437 | A1* | 3/2014 | Tanaka | A63F 13/12 463/42 |
| 2015/0080083 | A1* | 3/2015 | Tamaoki | A63F 13/85 463/17 |
| 2015/0100710 | A1 | 4/2015 | Kinashi et al. | |

FOREIGN PATENT DOCUMENTS

| | | |
|---|---|---|
| JP | 2014-000103 | 1/2014 |
| JP | 2015-075853 | 4/2015 |
| JP | 2014-090905 | 5/2015 |

* cited by examiner

CHARACTER SELECTION SCREEN 100

EXCHANGE CONFIRMATION SCREEN 200

CHARACTER DATA

- CHARACTER NAME
- LEVEL
- ABILITY VALUE
- RARENESS VALUE
  ⋮

DATA EXCHANGE SYSTEM, INFORMATION PROCESSING APPARATUS, STORAGE MEDIUM AND DATA EXCHANGE METHOD

CROSS REFERENCE OF RELATED APPLICATION

The disclosure of the patent application No. 2015-249979 filed on Dec. 22, 2015 is incorporated by reference.

FIELD

This application describes a data exchange system, an information processing apparatus, a storage medium and a data exchange method, capable of exchanging data between apparatuses.

SUMMARY

It is a primary object of a present embodiment(s) to provide a novel data exchange system, information processing apparatus, storage medium and data exchange method.

Furthermore, it is another object of the embodiment(s) to provide a data exchange system, information processing apparatus, storage medium and data exchange method, capable of preventing illicit duplication of valuable data.

A first embodiment is a data exchange system that exchanges data between a first apparatus and a second apparatus. The first apparatus comprises a first storing portion, and the first storing portion concerned is configured to store first exchange objective data. The second apparatus comprises a second storing portion, and the second storing portion concerned is configured to store second exchange objective data. A determination portion is configured to determine, based on both exchange objective data, whether it is a first state where a degree of valuableness of the first exchange objective data is higher than a degree of valuableness of the second exchange objective data or a second state where the degree of valuableness of the second exchange objective data is higher than the degree of valuableness of the first exchange objective data. A first temporary exchange processing portion is configured to make the first apparatus transmit the first exchange objective data to the second apparatus, and receive the second exchange objective data from the second apparatus. A second temporary exchange processing portion is configured to make the second apparatus transmit the second exchange objective data to the first apparatus, and receive the first exchange objective data from the first apparatus. A first fixing processing portion is configured to make the first apparatus transmit an instruction for fixing an exchange result to the second apparatus and the first storing portion store data for fixing the exchange result in the first state, and make the first storing portion store data for fixing the exchange result when receiving the instruction for fixing the exchange result from the second apparatus in the second state. A second fixing processing portion is configured to make the second apparatus transmit an instruction for fixing an exchange result to the first apparatus and the second storing portion store data for fixing the exchange result in the second state, and make the second storing portion store data for fixing the exchange result when receiving the instruction for fixing the exchange result from the first apparatus in the first state.

According to the first embodiment, since the apparatus of a side that transmits data having higher degree of valuableness transmits an instruction that makes an exchange result be fixed to the apparatus of another side, it is possible to shorten as much as possible a time period that the data having higher degree of valuableness is duplicated illicitly. That is, it is possible to prevent the data having higher degree of valuableness from being duplicated illicitly.

A second embodiment is according to the first embodiment, wherein each of the first storing portion and the second storing portion is an nonvolatile storage medium. The first storing portion is configured to store first after-exchange save data including the second exchange objective data that is made to be received by the first temporary exchange processing portion in addition to first before-exchange save data including the first exchange objective data. The second storing portion is configured to store the second after-exchange save data including the first exchange objective data that is made to be received by the second temporary exchange processing portion in addition to the second before-exchange save data including the second exchange objective data.

According to the second embodiment, since before-exchange save data of exchange objective data and after-exchange save data of exchange objective data are stored into the nonvolatile storage media, even if fault occurs at the time that the after-exchange save data is to be stored, it is possible to prevent all the save data from being lost.

A third embodiment is according to the second embodiment, wherein the first fixing processing portion is configured to make the first storing portion store data indicating that save data that is to used is the first after-exchange save data as the data for fixing the exchange result. Furthermore, the second fixing processing portion is configured to make the second storing portion store data indicating that save data that is to be used is the second after-exchange save data as the data for fixing the exchange result.

According to the third embodiment, since the exchange result is fixed only by making the storing portion store the data indicating that the after-exchange save data is used and thus the exchange result can be fixed in relatively short time, it is possible to prevent the power supply of apparatus from being turned off within such a short time period as much as possible, and therefore, it is possible to reduce a possibility that the exchange objective data is illicitly duplicated as much as possible.

A fourth embodiment is according to the second embodiment, wherein the first temporary exchange processing portion is configured to transmit, after receiving the second exchange objective data, a first preparation completion notification that notifies that preparation of rewriting to the first after-exchange save data is completed to the second apparatus, in the first state. Furthermore, the second temporary exchange processing portion is configured to receive the first exchange objective data, and transmit, after receiving the first preparation completion notification, a second preparation completion notification that notifies that preparation of rewriting to the second after-exchange save data is completed to the first apparatus, in the first state. Furthermore, the first fixing processing portion is configured to transmit, after receiving the second preparation completion notification, the instruction for fixing the exchange result to the second apparatus, in the first state.

On the other hand, the second temporary exchange processing portion is configured to transmit, after receiving the first exchange objective data, the second preparation completion notification that notifies preparation of rewriting to the first after-exchange save data is completed to the first apparatus, in the second state. Furthermore, the first temporary exchange processing portion is configured to receive the second exchange objective data, and transmit, after receiving the second preparation completion notification, the first preparation completion notification that notifies preparation of rewriting to the second after-exchange save data is completed to the second apparatus, in the second state. Furthermore, the second fixing processing portion is configured to transmit, after receiving the first preparation completion notification, the instruction for fixing the exchange result to the first apparatus, in the second state.

According to the fourth embodiment, since rewriting preparation is completed when the save after-exchange save data including the exchange objective data is stored to the nonvolatile storage media, a time period required for the processing for fixing the exchange result can be made relatively short. Therefore, it is possible to shorten as much as possible a time period that illicit duplication of the data can be performed.

A fifth embodiment is according to the fourth embodiment, wherein the first apparatus further comprises a first temporary storing portion that is a volatile storage medium. The first temporary exchange processing portion is configured to make the first temporary storing portion store the second exchange objective data, and transmit the first preparation completion notification to the second apparatus when the first after-exchange save data is written in the first storing portion.

On the other hand, the second apparatus further comprises a second temporary storing portion that is a volatile storage medium. The second temporary exchange processing portion is configured to make the second temporary storing portion store the first exchange objective data, and transmit the second preparation completion notification to the first apparatus when the second after-exchange save data is written in the second storing portion.

A sixth embodiment is according to the first embodiment, wherein the first exchange objective data includes first degree of valuableness data that indicates a degree of valuableness of the first exchange objective data concerned, and the second exchange objective data includes second degree of valuableness data that indicates a degree of valuableness of the second exchange objective data concerned. The degree of valuableness data is some data included in the exchange objective data, for example. However, the degree of valuableness data may be data that is described corresponding to the exchange objective data.

A seventh embodiment is according to the first embodiment, wherein the first apparatus further comprises a first wireless communication portion configured to perform wireless communication. Furthermore, the second apparatus further comprises a second wireless communication portion configured to perform wireless communication. The first apparatus and second apparatus perform wireless communication. Short-distance wireless communication can be performed by a radio wave or infrared ray, for example.

An eighth embodiment is according to the first embodiment, wherein the first apparatus further comprises a third wireless communication portion configured to perform Internet communication. Furthermore, the second apparatus further comprises a fourth wireless communication portion configured to perform Internet communication. Therefore, the first apparatus and second apparatus can perform communication via Internet.

According to the eighth embodiment, it is possible to perform selectively the short-distance wireless communication or the Internet communication.

A ninth embodiment is an information processing apparatus that exchanges data with a further apparatus configured to store first exchange objective data in a first storing portion, comprising: a second storing portion configured to store second exchange objective data; a determination portion configured to determine, based on both exchange objective data, whether it is a first state where a degree of valuableness of the first exchange objective data is higher than a degree of valuableness of the second exchange objective data or a second state where the degree of valuableness of the second exchange objective data is higher than the degree of valuableness of the first exchange objective data; a temporary exchange processing portion configured to transmit the second exchange objective data to the further apparatus and receive the first exchange objective data from the further apparatus; and a fixing processing portion configured to make the second storing portion store data for fixing an exchange result when receiving an instruction for fixing the exchange result from the further apparatus, in a first state, and transmit an instruction for fixing the exchange result to the further apparatus and make the second storing portion store data for fixing the exchange result, in the second state.

According to the ninth embodiment, like the first embodiment, it is also possible to prevent illicit duplication of valuable data.

A tenth embodiment is according to the ninth embodiment, wherein the second storing portion is an nonvolatile storage medium that is configured to store after-exchange save data including the first exchange objective data that is made to be received by the temporary exchange processing portion in addition to before-exchange save data including the second exchange objective data. The fixing processing portion is configured to make the second storing portion store data indicating that save data that is to be used is the after-exchange save data as data for fixing the exchange result.

According to the tenth embodiment, like the third embodiment, it is possible to reduce as much as possible a possibility that the exchange objective data is illicitly duplicated.

An eleventh embodiment is a non-transitory computer-readable storage medium storing a data exchange program to be executed by a computer that exchanges data with a further apparatus configured to store first exchange objective data in a first storage, and comprises a second storage configured to store second exchange objective data, wherein the data exchange program causes the computer to function as: a determination portion configured to determine, based on both exchange objective data, whether it is a first state where a degree of valuableness of the first exchange objective data is higher than a degree of valuableness of the second exchange objective data or a second state where the degree of valuableness of the second exchange objective data is higher than the degree of valuableness of the first exchange objective data; a temporary exchange processing portion configured to transmit the second exchange objective data to the further apparatus and receive the first exchange objective data from the further apparatus; and a fixing processing portion configured to make the second storage store data for fixing an exchange result when receiving an instruction for fixing the exchange result from the further apparatus, in a first state, and transmit an instruction for fixing the exchange result to the further apparatus and make the second storage store data for fixing the exchange result, in the second state.

According to the eleventh embodiment, like the first embodiment, it is also possible to prevent illicit duplication of valuable data.

A twelfth embodiment is according to the eleventh embodiment, wherein the second storage is an nonvolatile storage medium that is configured to store after-exchange save data including the first exchange objective data that is made to be received by the temporary exchange processing portion in addition to before-exchange save data including the second exchange objective data. The fixing processing portion is configured to make the second storage store data indicating that save data that is to be used is after-exchange save data as data for fixing the exchange result.

According to the twelfth embodiment, like the third embodiment, it is possible to reduce as much as possible a possibility that the exchange objective data is illicitly duplicated.

A thirteenth embodiment is a data exchange method that exchanges data between a parent apparatus and a child apparatus comprise storing portions configured to store exchange objective data, respectively, wherein the method causes to: at least one of the parent apparatus and the child apparatus determine based on both exchange objective data whether it is a predetermined state where a degree of valuableness of first exchange objective data is higher than a degree of valuableness of second exchange objective data; the parent apparatus and the child apparatus transmit exchange objective data to a partner apparatus and receive the exchange objective data from the partner apparatus; the parent apparatus transmit an instruction for fixing an exchange result to the child apparatus and store data for fixing the exchange result into own the storing portion, and the child apparatus store data for fixing the exchange result into own the storing portion when receiving the instruction for fixing the exchange result from the parent apparatus, when it is determined in the predetermined state; and when it is not determined in the predetermined state, the child apparatus perform processing to be performed by the parent apparatus when it is determined in the predetermined state and the parent apparatus perform processing to be performed by the child apparatus when it is determined in the predetermined state.

According to the thirteenth embodiment, like the first embodiment, it is also possible to prevent illicit duplication of valuable data.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
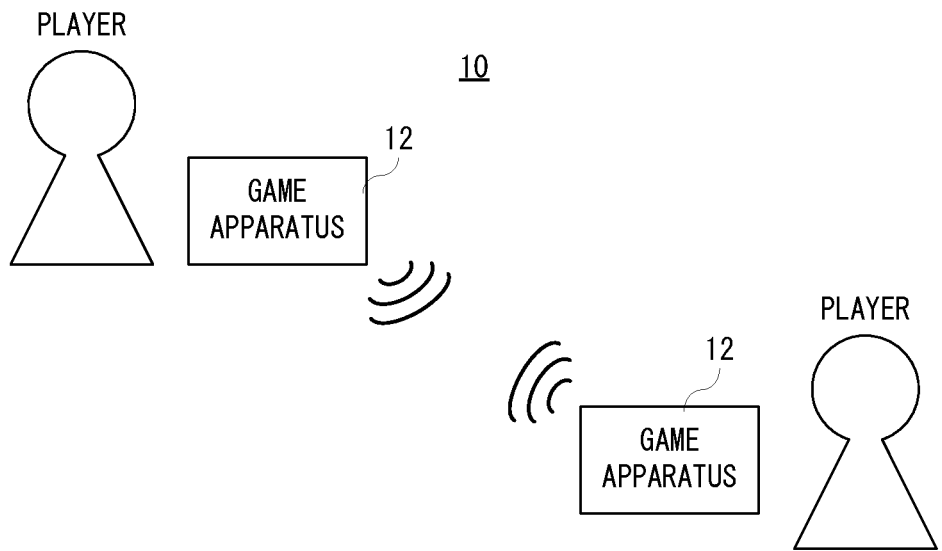
FIG. 1 shows a non-limiting example communication game system according to the present embodiment.

With reference to FIG. 1, a non-limiting example communication game system 10 includes a game apparatus 12 that is an example of an information processing apparatus or electronic apparatus. As described later, this game apparatus 12 also functions as a data exchange apparatus that exchanges (transmits and receives) data between another game apparatus 12. Therefore, the communication game system 10 can be called a data exchange system.

Furthermore, as shown also in FIG. 1, the communication game system 10 is constituted by at least two game apparatuses 12, and each of the two game apparatuses 12 is owned or used by a different user or player (hereinafter, simply called "player"). The game apparatus 12 is a game apparatus of a hand-held type (portable type), for example.

In addition, although the two game apparatuses 12 are shown in the communication game system 10 shown in FIG. 1, three or more game apparatuses 12 may be included. Furthermore, although FIG. 1 shows that the two game apparatuses 12 perform wireless communication directly with each other, the game apparatuses 12 may be communicably connected via a network such as Internet. Furthermore, the communication game system 10 may be modified in a manner that a server that can perform communication with respective game apparatuses 12 directly or via a network, and the server matches (decides) the two game apparatuses 12 that are to be communicably connected to each other.

Figure 2:
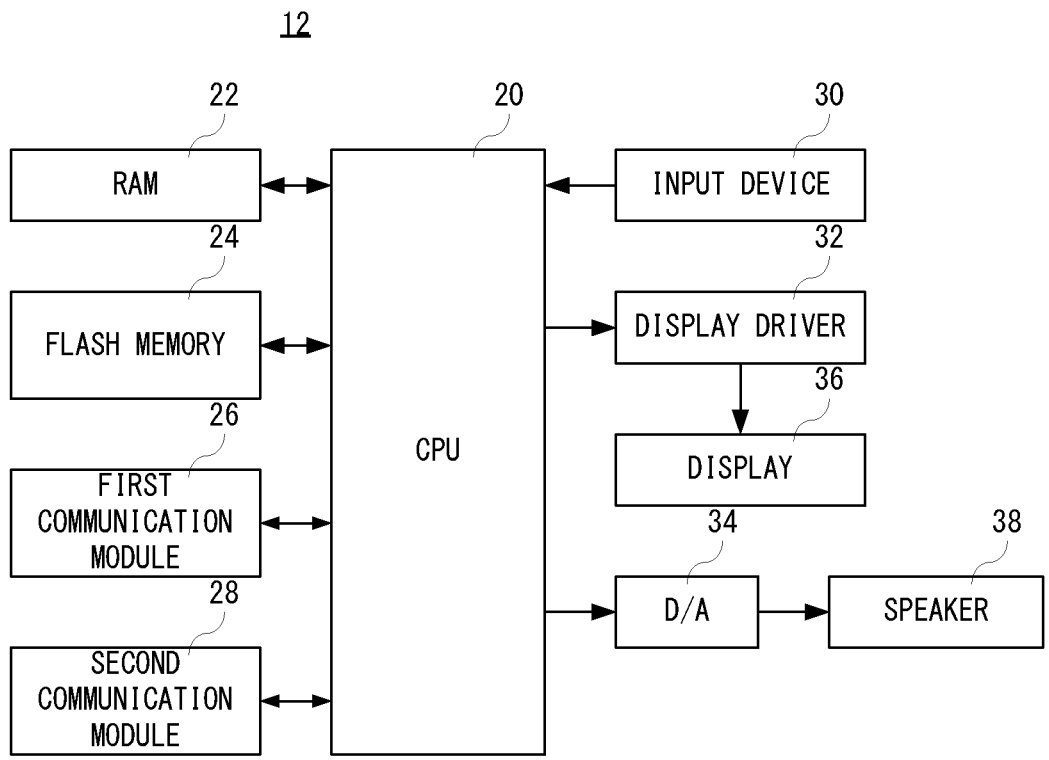
FIG. 2 is a block diagram showing non-limiting example electric structure of a game apparatus shown in FIG. 1.

FIG. 2 is a block diagram showing electric structure of the game apparatus 12 shown in FIG. 1. As shown in FIG. 2, the game apparatus 12 includes a CPU 20 that is connected with a RAM 22, a flash memory 24, a first communication module 26, a second communication module 28, an input device 30, a display driver 32 and a D/A converter 34. Furthermore, a display 36 is connected to the display driver 32, and a speaker 38 is connected to the D/A converter 34.

The CPU 20 is in charge of overall control of the game apparatus 12. The RAM 22 is a nonvolatile storage medium, and is used as a working memory and a buffer memory for the CPU 20. The flash memory 24 is a nonvolatile storage medium, and is used in order to store an application program such as a game application and to store (save) various kinds of data.

However, there is no necessity that an application is limited to a game application, various kinds of application such as a document production application, an email application, a painting application, character or letter practice application, a linguistic training application, a learning application, etc. correspond.

The first communication module 26 has a function to access a wireless LAN according to the standard of IEEE802.11.b/g, for example. Therefore, the CPU 20 transmits or receives data to or from other equipment (computers, other game apparatuses 12, etc.) via an access point and Internet (network) with using the first communication module 26, for example. However, it is also possible to transmit or receive data to or from other equipment directly with using the first communication module 26.

The second communication module 28 has a function to perform short-distance wireless communication. Specifically, the second communication module 28 has a function to transmit or receive an infrared signal to or from other equipment (other game apparatuses etc.) with a predetermined communication system (infrared system, for example), and a function to perform wireless communication between the same or similar kind of game apparatus according to a predetermined communication protocol (multilink protocol, for example). Therefore, the CPU 20 can transmit or receive data to or from the same or similar kind of other game apparatuses directly with using the second communication module 28, for example. However, instead of the short-distance wireless communication of an infrared system, short-distance wireless communication according to other wireless-communication standards such as Bluetooth (registered trademark) may be performed.

The input devices 30 are various kinds of push buttons or switches that are provided on the game apparatus 12, for example, and are used by the user for various kinds of operations such as menu selection and a game operation. However, as the input device 30, instead of the push buttons or switches, or together with the push buttons or switches, input portion such as a pointing devices (a touch panel etc., for example), a microphone, a camera, etc. may be provided. Furthermore, the touch panel may be built into a display 36 described later. The display 36 in this case is a touch panel integral type display.

The display driver 32 is used in order to display various kinds of images such as a game image on the display 36 under instructions of the CPU 20. Although illustration is omitted, the display driver 32 contains a video RAM (VRAM).

The D/A converter 34 converts sound data applied from the CPU 20 into an analog game sound, and outputs the same to the speaker 38. In addition, the game sound means is a sound signal corresponding to a sound required for the game, such as an imitation sound of a game character or object, sound effect and music (BGM).

In addition, the electric structure of the game apparatus 12 shown in FIG. 2 is a mere example, and it does not need to be limited to this.

With such a game apparatus 12, it is possible to play a game that a player character comes to an adventure trip. For example, in this game, according to an operation by the player, the player character moves in a game world constructed in a virtual space, captures a wild monster character existing in the game world, and makes the monster character that is captured (owned) fight with a monster character owned by a non-player character (not shown) or a wild monster existing in the world. Furthermore, the player character acquires and uses a predetermined item (not shown) according to an operation by the player.

Furthermore, the player can exchange a monster character (hereinafter, simply called "character") that is owned by performing, using the game apparatus 12, communication with a player of another game apparatus 12.

Figure 3:
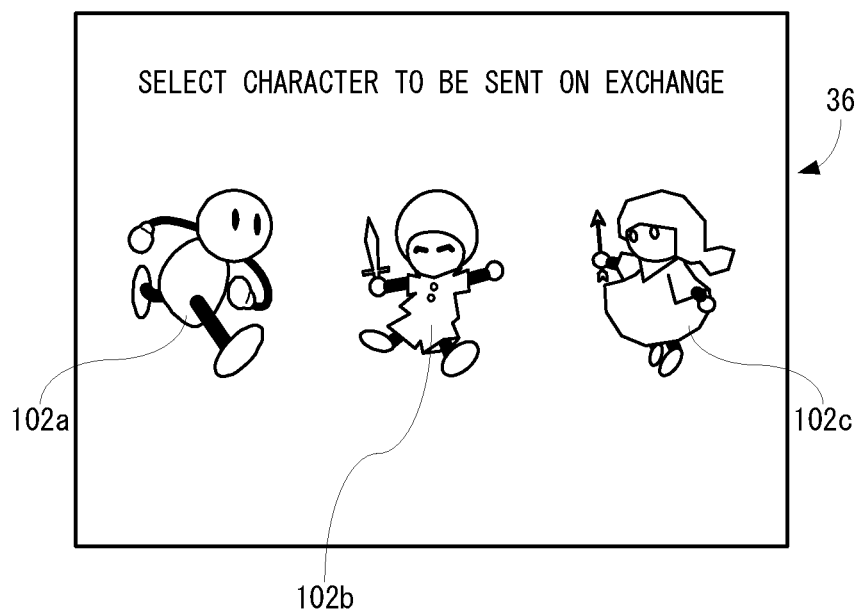
FIG. 3 shows a non-limiting example character selection screen that is displayed on a display of the game apparatus shown in FIG. 1.

FIG. 3 is an illustration view showing an example of a character selection screen 100 that is displayed on the display 36 provided in the game apparatus 12. If the player selects (instructs) exchanging characters under execution of a game application, for example, when selecting a character that is to be provided to a partner player who exchanges a character (to be sent on exchange), this character selection screen 100 is displayed on the display 36.

Although a detailed description is omitted, as described above, the game apparatus 12 of this embodiment is capable of (1) communicating with other game apparatuses 12 via Internet with using the first communication module 26, (2) communicating other game apparatuses 12 directly with using the first communication module 26, or (3) communicating with other game apparatuses 12 directly with using the second communication module 28. Therefore, by selecting any one method from the methods of (1)-(3), the player can decide in advance the character is to be exchanged with another game apparatus 12 that exists in what kind of place. Otherwise, it is also possible to select any one method from the methods of (1)-(3) according to a place that another specific game apparatus 12 for which character is to be exchanged exists.

When the method of (1) is selected, for example, it is possible to exchange characters with another game apparatus 12 under connection with Internet. Therefore, characters can be exchanged also with another player who exists in a remote place. When the method of (2) is selected, it is possible to exchange characters with another game apparatuses 12 existing within a range that a radio wave reaches from the game apparatus 12. That is, characters can be exchanged between another player who exists in a circumference of the player. When the method of (3) is selected, it is possible to exchange characters with another game apparatus 12 that is placed within a range that an infrared ray reaches from the game apparatus 12 and in a direction that can transmit and receive the infrared ray. Therefore, it is possible to exchange characters with a player of acquaintance (other) who exists near the player.

Returning to FIG. 3, a plurality of (three (3) bodies, for example) characters 102*a*, 102*b* and 102*c* are displayed abreast on the character selection screen 100. Furthermore, a message that a character to be sent on exchange should be selected is displayed above the characters 102*a*-102*c* in the character selection screen 100. For example, the characters 102*a*-102*c* are characters that may be sent on exchange (candidate of an exchange objective character), and are selected (decided) in advance by the player from a plurality of characters (fellow character) owned by the player or player character. Although the character selection screen 100 shown in FIG. 3 shows a case where the characters 102*a*-102*c* of three bodies are selected as candidates of the exchange objective character, this is only an example, and the number of the characters does not need to be limited.

For example, the player selects the character 102*a*, 102*b* or 102*c* to be sent on exchange in the character selection screen 100 with using the input device 30. In two game apparatuses 12 (game apparatuses 12 of both sides) that exchange characters, if the character to be sent on exchange is selected, an exchange confirmation screen 200 as shown in FIG. 4 is displayed by the display 36 on each game apparatus 12.

Figure 4:
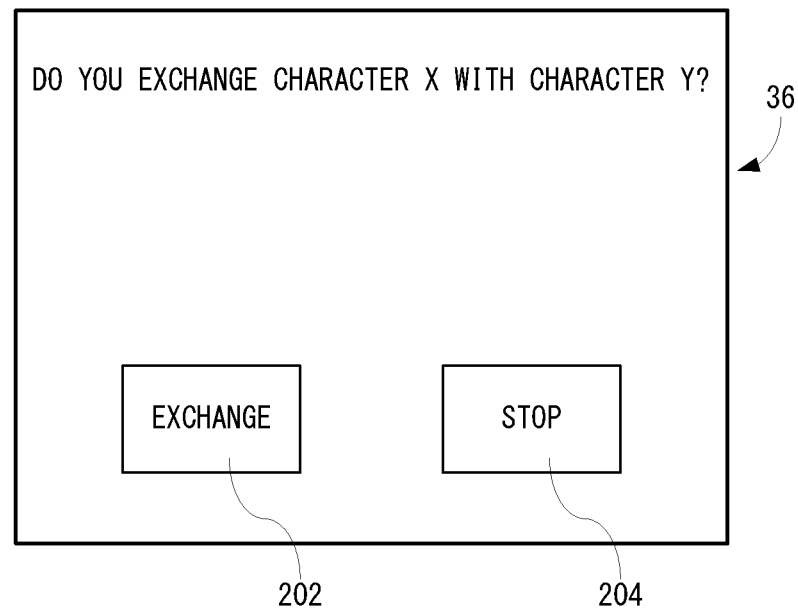
FIG. 4 shows a non-limiting example exchange confirmation screen that is displayed on the display of the game apparatus shown in FIG. 1.

As shown in FIG. 4, the exchange confirmation screen 200 is a screen for confirming whether the character is to be actually exchanged, and is arranged with an icon 202 and an icon 204. The icon 202 is provided in order to fix exchanging characters. The icon 204 is provided in order to stop exchange of characters. Furthermore, a message for confirming whether the character is to be exchanged is displayed in the exchange confirmation screen 200. In an example shown in FIG. 4, a message "whether character X and character Y are to be exchanged" is displayed.

It should be noted that in this specification, the character X is a character (or character name) that is owned by a player or player character of the game apparatus 12 that functions as a parent apparatus, and decided to be sent on exchange. Furthermore, the character Y is a character (or character name) that is owned by a player or player character of the game apparatus 12 that functions as a child apparatus, and decided to be sent on exchange.

Figure 5:
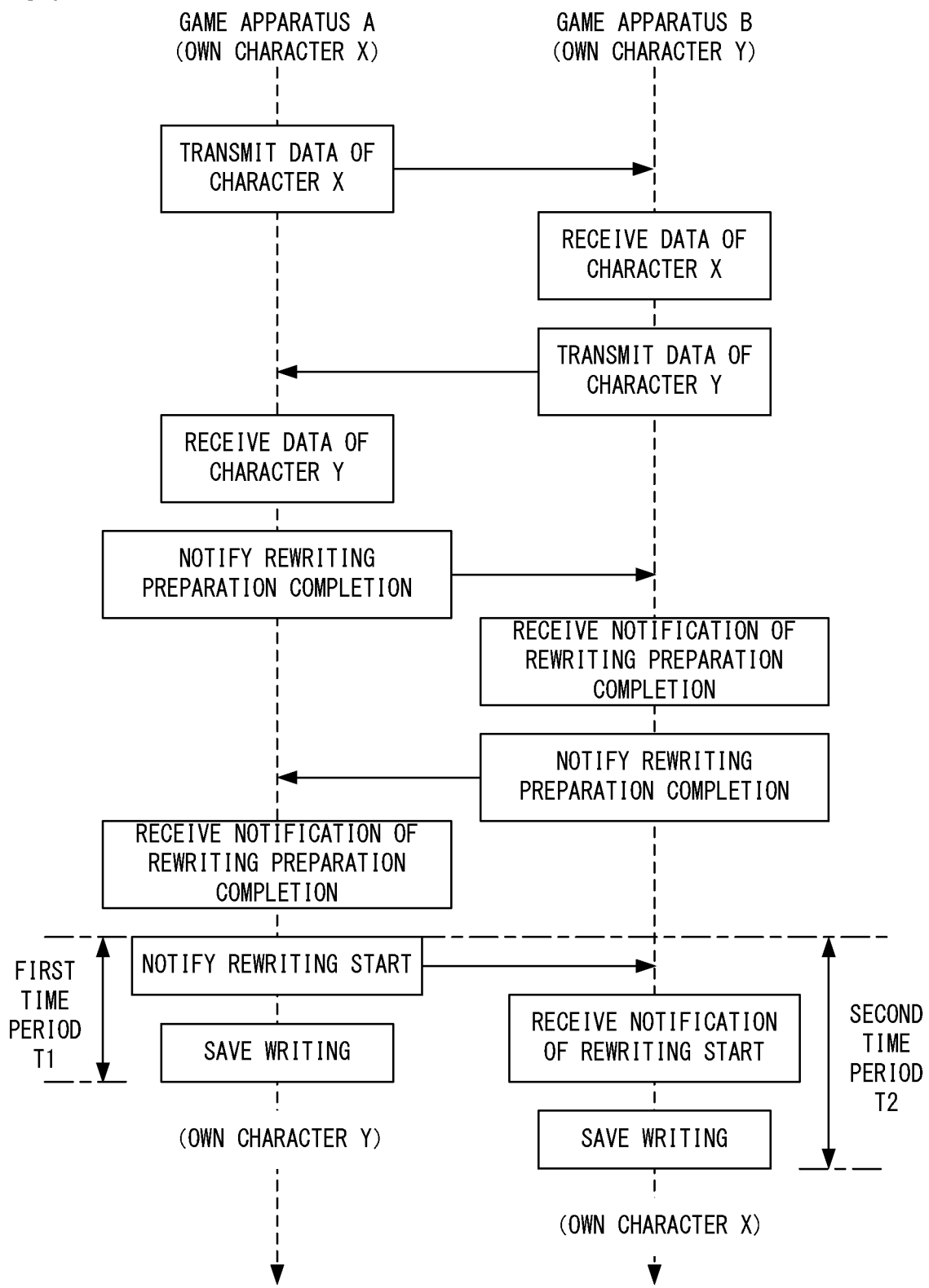
FIG. 5 is an illustration view showing a non-limiting example rough flow of exchange processing in a case where characters are exchanged between two game apparatuses.

If the icon 202 of the exchange confirmation screen 200 is selected (turned on) on both game apparatuses 12, that is, it is confirmed that the characters are to be exchanged, processing (exchange processing) that exchanges the character X and the character Y. According to FIG. 5, rough flow of the exchange processing will be described. In FIG. 5, one game apparatus 12 is called a "game apparatus A" out of the two game apparatuses that exchange characters, and the other game apparatus 12 is called a "game apparatus B." Furthermore, here, the game apparatus A functions as a parent apparatus, and the game apparatus B functions as a child apparatus. However, when the game apparatus A and the game apparatus B do not need to be distinguished, only called the "game apparatus 12."

Figures 6, 8:
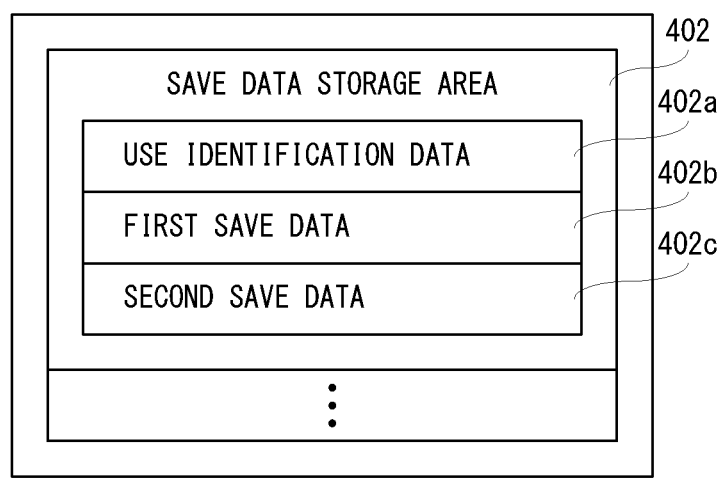
FIG. 6 is an illustration view showing non-limiting example contents of character data corresponding to a character.
FIG. 8 is an illustration view showing a non-limiting example memory map of a flash memory that is incorporated in the game apparatus shown in FIG. 2.

As shown in FIG. 5, if the character exchange processing is started, the game apparatus A transmits data of the character X (character data) to the game apparatus B first. Here, the character data means information concerning a character, such as a character name, a level, an ability value, a rareness value, etc., as shown in FIG. 6. The character name is a name (identification information) applied to the character corresponding to the character data concerned. The level is a numerical value indicating a level (level in a game) of the character corresponding to the character data concerned. The ability value is a numerical value indicating a degree of ability about each of attack and defense of the character corresponding to the character data concerned. The rareness value is a numerical value indicating a frequency (probability) that the character corresponding to the character data concerned appears in the game. In this embodiment, it means that the frequency of appearance is reduced more and thus rarity is raised more as the rareness value is smaller.

In addition, further information required for the game is also included in the character data. Furthermore, the character data shown in FIG. 6 is the same not only about the character X and the character Y but characters other than these.

Furthermore, in this embodiment, the rarity is made higher as the rareness value is smaller, but the rarity may be made higher as the rareness value is larger.

Returning to FIG. 5, the game apparatus B transmits character data of the character Y to the game apparatus A if the character data of the character X is received. Then, the game apparatus A receives the character data of the character Y. Although omitted in FIG. 5, the game data (save data) including the character data of the character Y is written in the flash memory 24 in the game apparatus A, and the game data (save data) including the character data of the character X is written in the flash memory 24 in the game apparatus B. If the writing of the game data (save data) to the flash memory 24 is completed, each game apparatus 12 determines that rewriting preparation of save data is completed, and notifies that to the game apparatus 12 of a communication partner (character exchange partner).

In this embodiment, as shown in FIG. 5, the game apparatus A notifies the game apparatus B that the rewriting preparation is completed. If receiving a notification of the rewriting preparation completion from the game apparatus A, the game apparatus B notifies the game apparatus A that rewriting preparation is completed when the rewriting preparation of save data is completed. However, the game apparatus B notifies the game apparatus A immediately that the rewriting preparation is completed in response to the notification from the game apparatus A if the rewriting preparation of save data is already completed at the time that the notification that the rewriting preparation is completed from the game apparatus A is received.

If receiving the notification that the rewriting preparation is completed from the game apparatus B, the game apparatus A notifies the game apparatus B writing start and performs save writing that writes the data that fixes an exchange result in the flash memory 24. In FIG. 5, it is indicated that the save writing is started after notifying the writing start, but these are performed almost simultaneously. In the save writing, data of identification information (use identification data 402a (see FIG. 8)) that indicates (identifies) which save data is to be used out of a plurality of (two (2), in this embodiment) save data stored in the flash memory 24 is stored (updated) in the flash memory 24. That is, rewriting of save data is completed. However, the use identification data 402a is equal to data that fixes the exchange result. On the other hand, the game apparatus B receives the notification of the writing start from the game apparatus A, and performs the save writing. If terminating the save writing correctly, the player or player character of the game apparatus A becomes to own the character Y, and the player or player character of the game apparatus B becomes to own the character X.

Thus, the characters can be exchanged between the two game apparatuses 12. However, in this exchange processing, the save data including character data of an exchanged character is stored in the flash memory 24 of each game apparatus 12 at a stage that the rewriting preparation is completed.

Therefore, as shown in FIG. 5, if a power supply of only the game apparatus A is turned off within a time period (first time period) T1 from notifying the writing start to the game apparatus B from the game apparatus A to terminating the save writing, the save writing is not completed at a side of the game apparatus A, and therefore, the use identification data 402a is not updated, and accordingly, the save data before update (before exchange) remains as the save data to be used. On the other hand, at a side of the game apparatus B, since the save writing is completed and the use identification data 402a is updated, the save data after update (after exchange) is changed to the save data to be used. That is, the character X is duplicated.

Furthermore, as shown in FIG. 5, if a power supply of only the game apparatus B is turned off within a time period (second time period) T2 from notifying the writing start to the game apparatus B from the game apparatus A to terminating the save writing, the save writing is not completed at a side of the game apparatus B, and therefore, the use identification data 402a is not updated, and accordingly, the save data before update (before exchange) remains as the save data to be used. On the other hand, at a side of the game apparatus A, since the save writing is completed and the use identification data 402a is updated, the save data after update (after exchange) is changed to the save data to be used. That is, the character Y is duplicated.

Each of such duplication is not what a developer, a seller, etc. intended, and therefore, may be performed illicitly. However, the first time period T1 is the same or similar to a time required for the save writing, and as described above, since the save writing rewrites only the use identification data 402a, the save writing is relatively short time. On the other hand, since a time until the notification of the writing start from the partner game apparatus 12 is added to a time required for the save writing, the second time period T2 becomes longer than the first time period T1 by a time required for communication.

Therefore, if it sets up to send the character Y being rare on exchange, for example in the game apparatus B that functions as a child apparatus, when the power supply of only the game apparatus B is turned off in the second time period T2 longer than the first time period T1, the character Y being rare can be relatively easily duplicated. It is considered that when the two game apparatuses 12 perform communication with each other via Internet, difficulty of this duplication decreases because the time required for the communication becomes longer than a case where the two game apparatuses 12 perform communication with each other directly.

Therefore, in this embodiment, the rareness values (rarities) included in the character data are compared with each other, and when the rarity of the character Y is higher than the rarity of the character X, the writing start is notified from the game apparatus B to the game apparatus A, thereby to shorten as much as possible a time period that above-described illicit duplication can be performed. That is, the processing after the processing that notifies the writing start shown in FIG. 5 becomes reverse with the parent apparatus and the child apparatus. In other words, the child apparatus is made to perform the processing to be performed by the parent apparatus. Accordingly, an illicit duplication is prevented.

Figure 7:
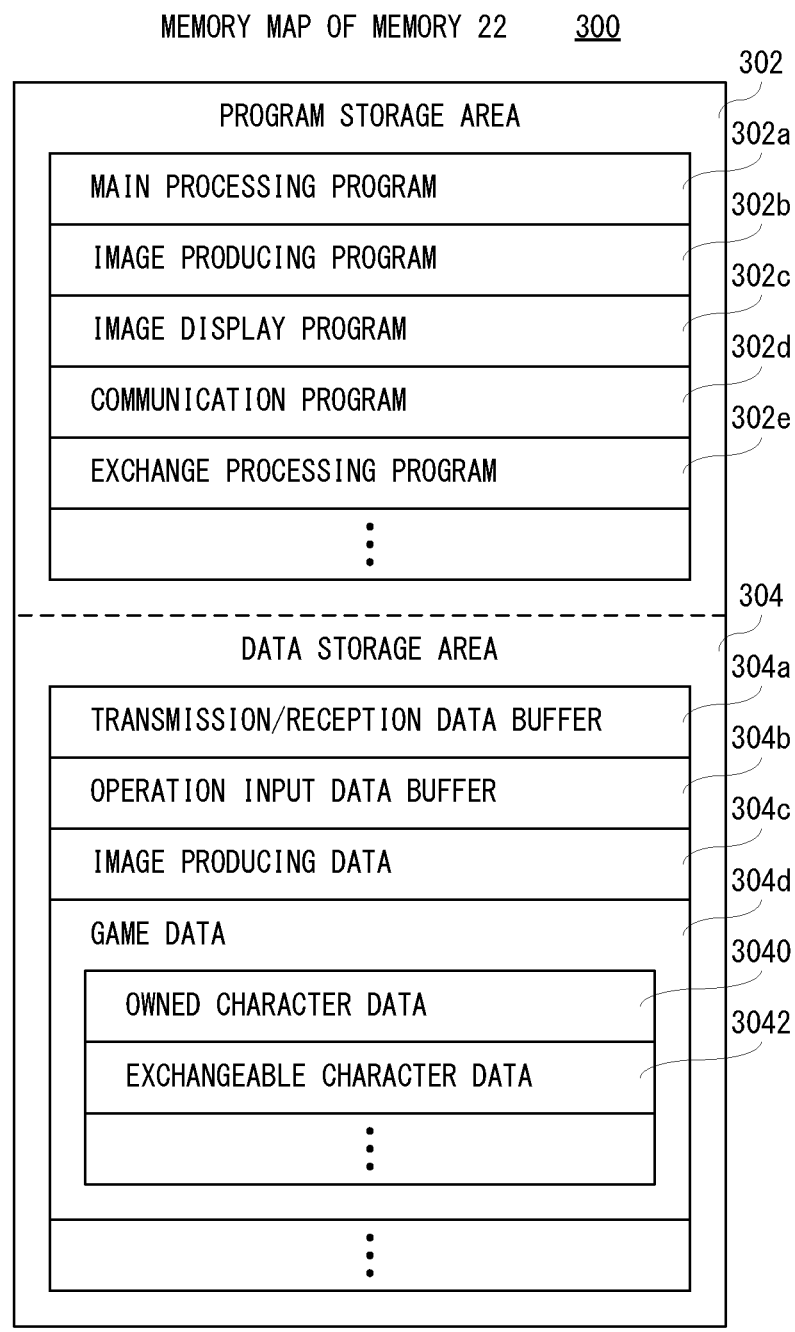
FIG. 7 is an illustration view showing a non-limiting example memory map of a RAM that is incorporated in the game apparatus shown in FIG. 2.

FIG. 7 is an illustration view showing an example of a memory map 300 of the RAM 22 of the game apparatus 12 shown in FIG. 2. Since a parent apparatus and a child apparatus are decided at the time that characters are exchanged, the game apparatus 12 is controlled so as to operate as a parent apparatus or a child apparatus. Therefore, a program(s) and data stored in the RAM 22 are a program(s) and data operable as a parent apparatus or a child apparatus.

As shown in FIG. 7, the RAM 22 includes a program storage area 302 and a data storage area 304. In the program storage area 302, an information processing program such as an application program of a game of this embodiment is stored, and the information processing program includes a main processing program 302a, an image producing program 302b, an image display program 302c, a communication program 302d, an exchange processing program 302e, etc.

The main processing program 302a is a program for processing a main routine of game processing of this embodiment. The image producing program 302b is a program for producing data (game image data) of game images (the character selection screen 100, the exchange confirmation screen 200, etc.) with using image producing data 304c. The image display program 302c is a program for outputting the game image data that is produced according to the image producing program 302b to the display 36. Therefore, the game image corresponding to game image data is displayed on the display 36.

The communication program 302d is a program for performing communication with other game apparatuses 12 directly or via a network. As described above, any one of three (3) methods is selected, and communication processing is performed by a selected method.

The exchange processing program 302e is a program for exchanging characters with another game apparatuses 12 (player). However, as described above, the exchange processing program 302e differs in a part of contents of processing according to whether the game apparatus 12 functions as the parent apparatus or the child apparatus. Details will be described later with using flowcharts shown in FIG. 9-FIG. 12.

Although illustration is omitted, the program storage area 302 is also stored with other programs such as a program for saving (preserving) game data (save data) to the flash memory 24, a sound output program for producing and outputting a sound required for the game, etc.

A transmission/reception data buffer 304a and an operation input data buffer 304b are provided in the data storage area 304. Furthermore, the data storage area 304 is stored with data such as the image producing data 304c, game data 304d, etc.

The transmission/reception data buffer 304a is an area for storing temporarily the data transmitted to or received from another game apparatus 12. In a case where the characters are exchanged, the transmission/reception data buffer 304a is stored with character data corresponding to a character to be exchanged and data corresponding to the notification in the exchange processing. The operation input data buffer 304b is an area for storing operation data from the input device 30 temporarily.

The image producing data 304c includes data such as polygon data, texture data, character image data, etc. for producing game image data. In addition, the character image data is image data about various kinds of characters that come (appear) in a game, and stored in correspondence (connection) to a character name (identification information).

The game data 304d is data on the way of the game or result data about the game of this embodiment, and includes owned character data 3040, exchangeable character data 3042, etc. Although illustration is omitted, the game data 304d also includes a level of the player or player character, a progress situation (cleared stage etc.) of the game, the number of remaining player characters, etc.

The owned character data 3040 is the character data about one or more characters that the player or player character acquires (captures) under progress of the game. The exchangeable character data 3042 is the character data about a character that is allowed (permitted) to be sent on exchange according to an operation of the player or the progress of the game. However, as for the exchangeable character data 3042, it may be considered that only data of identification information of a character (character name) is stored, and the character data indicated by the identification information is acquired from the owned character data 3040 at the time of character exchange. In addition, the character data is as having explained using FIG. 6.

Although illustration is omitted, the data storage area 304 may be further stored with other data and a flag(s) and a counter(s) (timer(s)) required for game processing (information processing).

FIG. 8 is an illustration view showing an example of a memory map 400 of the flash memory 24. The flash memory 24 includes storage areas such as a save data storage area 402, etc. In the save data storage area 402, the use identification data 402a, the first save data 402b and the second save data 402c are stored.

The use identification data 402a is data about identification information for indicating (identifying) which save data of the first save data 402b and the second save data 402c is to be used. For example, the use identification data 402a is constructed by a 1-bit register, and when the first save data 402b is to be used, a value of the register is set as "0", and when the second save data 402c is to be used, the value of the register is set as "1." In addition, the value of the register is updated when the character exchange processing is performed according to the exchange processing program 302e.

The first save data 402b is save data that is identified to be used or before-generation save data. Similarly, the second save data 402c is save data that is identified to be used or before-generation save data. However, the save data that is identified to be used is save data after exchanging characters (after-exchange save data). On the other hand, the before-generation save data is save data before exchanging characters (before-exchange save data).

In this embodiment, the save data is overwritten by turns on the first save data 402b and the second save data 402c, and the save data to be used is fixed (decided) by the above-described use identification data 402a.

For example, even when malfunction such as failing in the save writing occurs, it is possible to prevent all the save data from being lost since the before-generation save data is left by storing the first save data 402b and the second save data 402c.

Furthermore, when the save writing is performed correctly, the above-described use identification data 402a indicates that the save data to be used is not the before-exchange save data but the after-exchange save data.

In addition, in the flash memory 24, other than the save data of the game according to this embodiment, a game program(s) and another application program(s) may be stored, and further, save data of another application(s), etc. may be stored.

Figure 9:
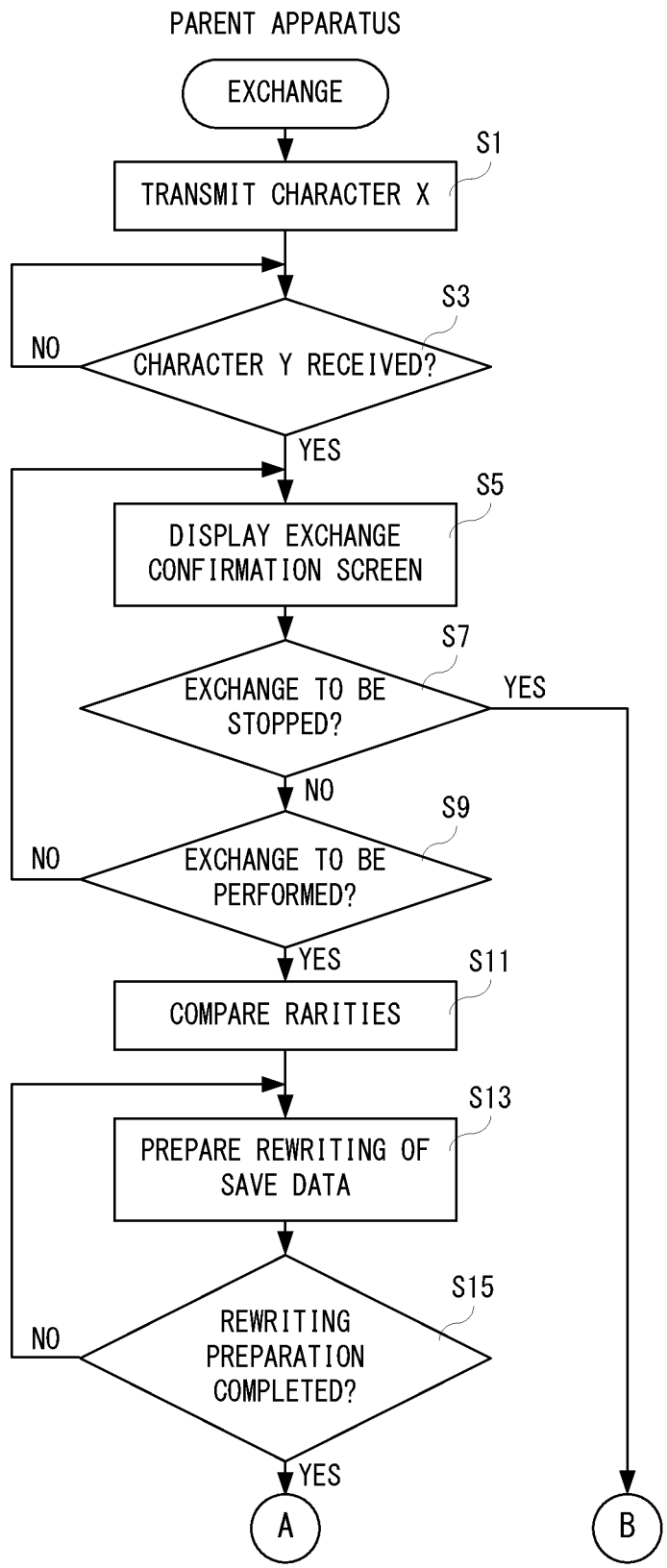
FIG. 9 is a flowchart showing a part of non-limiting example exchange processing of a CPU of a game apparatus that functions as a parent apparatus.
Figure 10:
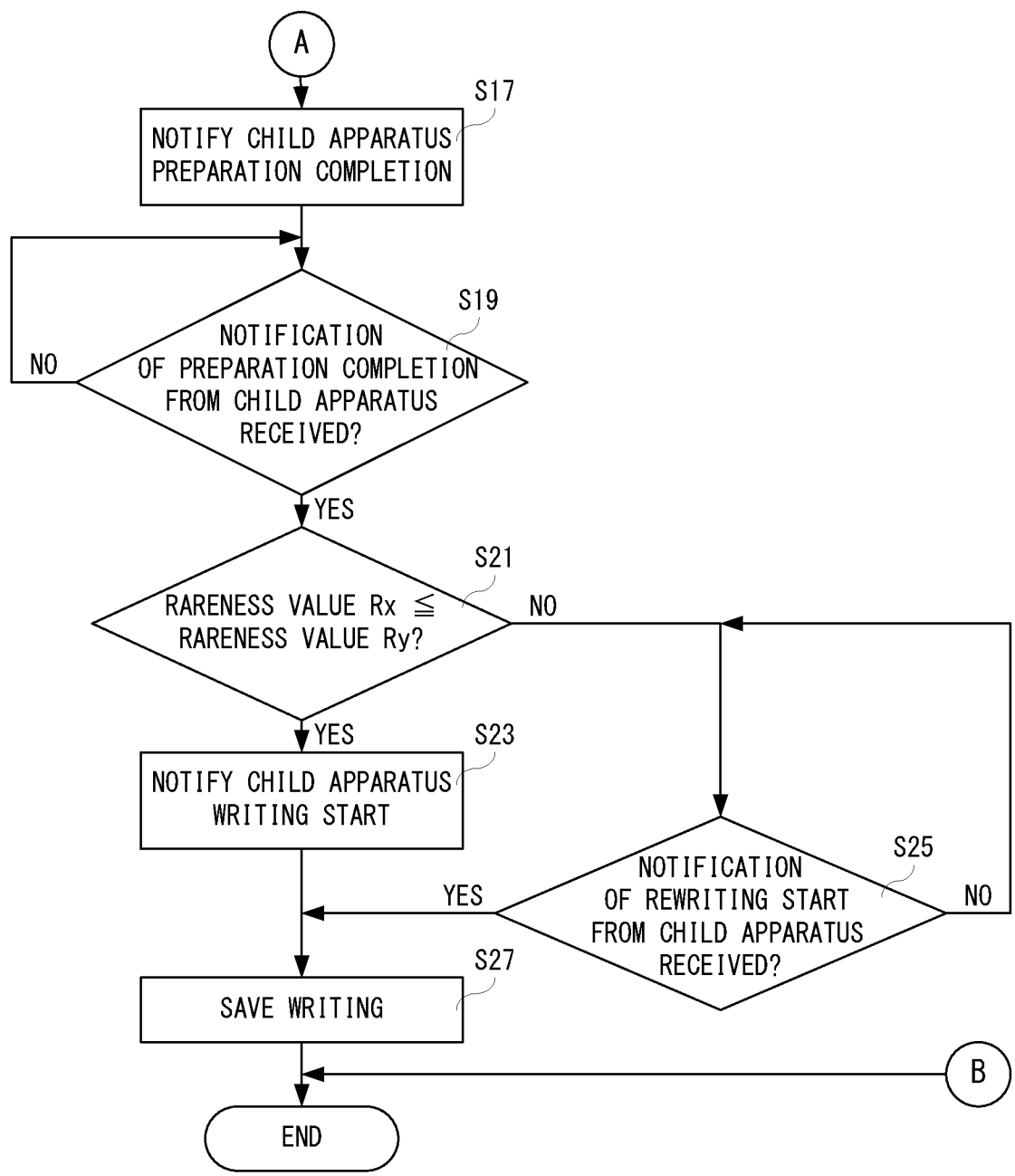
FIG. 10 is a flowchart showing another part of the non-limiting example exchange processing of the CPU of the game apparatus that functions as a parent apparatus, following FIG. 9.
Figure 11:
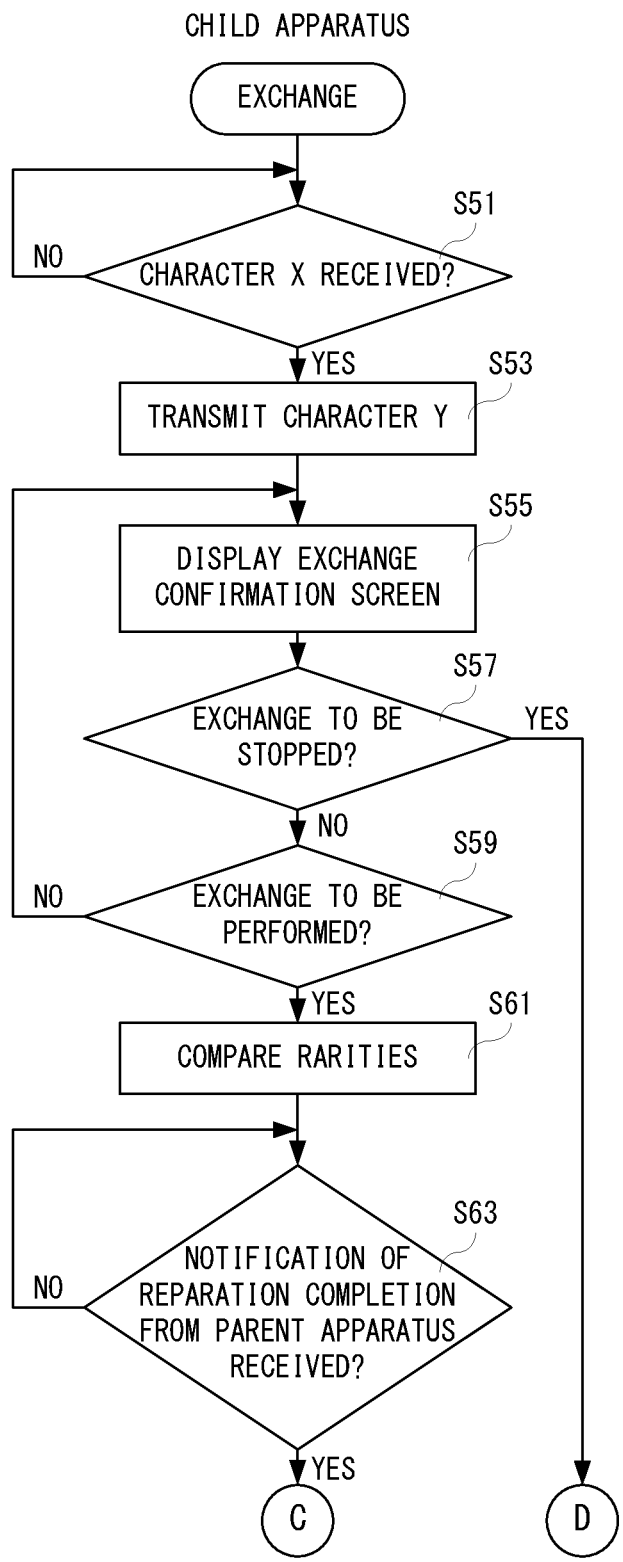
FIG. 11 is a flowchart showing a part of non-limiting example exchange processing of a CPU of a game apparatus that functions as a child apparatus.
Figure 12:
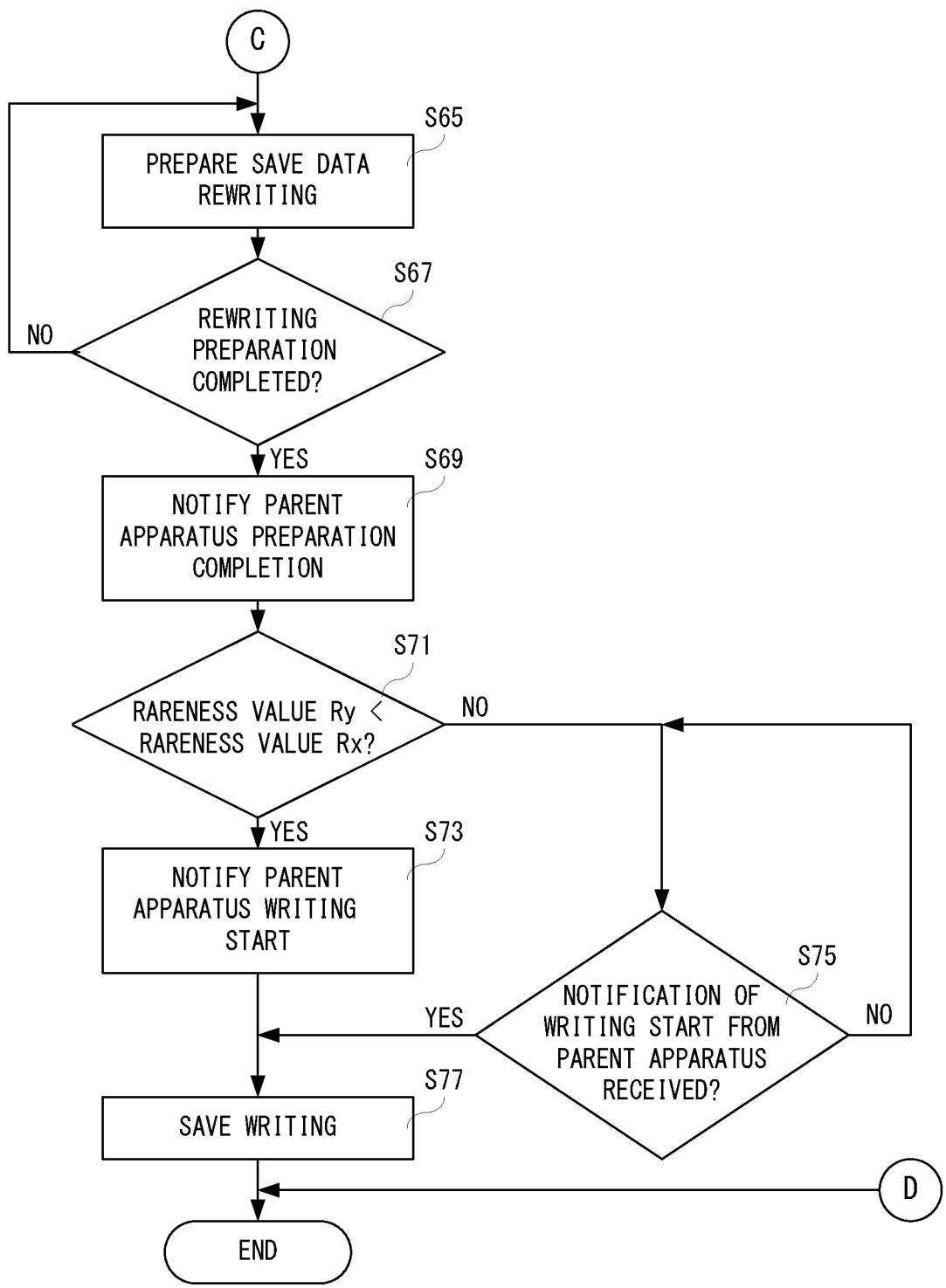
FIG. 12 is a flowchart showing another part of the non-limiting example exchange processing of the CPU of the game apparatus that functions as a child apparatus, following FIG. 11.

FIG. 9 and FIG. 10 are flowcharts showing an example of exchange processing of the CPU 20 of the game apparatus 12 that functions as a parent apparatus. Furthermore, FIG. 11 and FIG. 12 are flowcharts showing an example of exchange processing of the CPU 20 of the game apparatus 12 that functions as a child apparatus.

In addition, although illustration is omitted, as a premise that character exchange is performed between the two game apparatuses 12, in each game apparatus 12, for example, exchanging characters is selected in a menu screen according to an operation by the player, and according to this, each game apparatus 12 searches the game apparatus 12 that is a communication partner of another player and establishes a communicatable state with the game apparatus 12 that is searched and thus the communication partner. Then, if the players of both game apparatuses 12 select exchange objective characters in the above-described character selection screen 100, the character exchange processing (FIG. 9, FIG. 10, FIG. 11 and FIG. 12) is started. Furthermore, when searching a communication partner or when establishing a communicable state, it is decided that one game apparatus 12 functions as a parent apparatus and that the other game apparatus 12 functions as a child apparatus. As a deciding method of the parent apparatus and the child apparatus, a well-known method is employable. However, since this deciding method is not essential contents of this embodiment, a description thereof is omitted.

As shown in FIG. 9, if the exchange processing is started, the CPU 20 of the parent apparatus (equivalent to the game apparatus A of FIG. 5) transmits, in a step S1, the character data of the character X to the other game apparatus 12 (child apparatus) that is a communication partner. Although detailed description is omitted, data to be transmitted is once stored in the transmission/reception data buffer 304a, and then, transmitted according to the communications processing according to the communications program 302d.

In addition, the communication processing according to the communications program 302d is performed in parallel to the exchange processing, and transmits the data that is stored in the transmission/reception data buffer 304a to the game apparatus 12 of the communication partner, or receives the data that is transmitted by the communication partner and stores it in the transmission/reception data buffer 304a.

In a subsequent step S3, it is determined whether the character data of the character Y transmitted from the child apparatus (equivalent to the game apparatus B of FIG. 5) is received. Here, the CPU 20 determines whether received character data is stored in the transmission/reception data buffer 304a.

If "NO" is determined in the step S3, that is, if the character data of the character Y is not received, the process returns to the step S3. In addition, in this embodiment, when not receiving the character data, the process returns to the same step S3 to wait for reception of that character data, but it does not need to be limited to this. For example, when not receiving the character data even if a predetermined time period (30 seconds, for example) elapses after ending processing of the step S1, the exchange processing may be forcedly terminated by determining that a communication error occurs. This is the same also about a case where notification data from the other game apparatus 12 is not received.

On the other hand, if "YES" is determined in the step S3, that is, if the character data of the character Y is received, the exchange confirmation screen 200 as shown in FIG. 4 is displayed on the display 36 in a step S5. In a next step S7, it is determined whether the exchange is to be stopped. Here, the CPU 20 determines whether the icon 204 is selected (turned on) in the exchange confirmation screen 200.

If "YES" is determined in the step S7, that is, if stopping the exchange, the exchange processing is terminated as shown in FIG. 10. Therefore, in the child apparatus, communication with the parent apparatus is shut off and the exchange processing is ended due to occurrence of a communication error. However, before the parent apparatus may notify the child apparatus the exchange is stopped before terminating the exchange processing. In such a case, the CPU 20 of the child apparatus receives notification stopping the exchange, and ends the exchange processing. In addition, when stopping the exchange is selected at a side of the child apparatus, the exchange processing is ended in the parent apparatus.

On the other hand, if "NO" is determined in the step S7, that is, if stopping the exchange is not selected, it is determined whether exchange is to be performed in a step S9. Here, the CPU 20 determines whether the icon 202 is selected (turned on) in the exchange confirmation screen 200.

If "NO" is determined in the step S9, that is, if exchanging is also not selected, the process returns to the step S5. On the other hand, if "YES" is determined in the step S9, that is, if the exchange is to be performed, the rarities are compared with each other in a step S11. Here, the CPU 20 compares the rareness value Rx included in the character data of the character X with the rareness value Ry included in the character data of the character Y. Although illustration and description are omitted, a comparison result is stored in the data storage area 304 temporarily.

In a next step S13, save data rewriting is prepared. Here, the CPU 20 updates the save data that is stored before last time in the save data storage area 402 of the flash memory 24 to the save data (after-exchange save data) containing character data after exchange. Then, it is determined whether rewriting preparation is completed in a step S15. That is, the CPU 20 determines whether update of the above-described save data is ended.

If "NO" is determined in the step S15, that is, if the rewriting preparation is not completed, the process returns to the step S13. On the other hand, if "YES" is determined in the step S15, that is, if the rewriting preparation is completed, preparation completion is notified to the child apparatus in a step S17 shown in FIG. 10, and it is determined, in a step S19, whether a notification of preparation completion is received from the child apparatus. Here, the CPU 20 determines whether notification data of the preparation completion from the child apparatus is stored in the transmission/reception data buffer 304a.

If "NO" is determined in the step S19, that is, if the notification of the preparation completion is not received, the process returns to the step S19. On the other hand, if "YES" is determined in the step S19, that is, if the notification of the preparation completion is received, it is determined, in a step S21, whether the rareness value Rx of the character X is equal to or less than the rareness value Ry of the character Y. Here, the CPU 20 determines magnitudes of the rareness value Rx and the rareness value Ry based on the comparison result in the step S11.

If "YES" is determined in the step S21, that is, when the rareness value Rx is equal to or less than the rareness value Ry, it is determined that the rarity of the character X is equal to or higher than the rarity of the character Y, and writing start is notified to the child apparatus in a step S23, and then, the process proceeds to a step S27. On the other hand, if "NO" is determined in the step S21, that is, when the rareness value Rx is larger than the rareness value Ry, it is determined that the rarity of the character X is lower than the rarity of the character Y, and it is determined, in a step S25, whether writing start from the child apparatus is received.

If "NO" is determined in the step S25, that is, if not receiving the notification of writing start from the child apparatus, and the process returns to the step S25. On the other hand, if "YES" is determined in the step S25, that is, if the notification of writing start from the child apparatus is received, the process proceeds to a step S27.

In the step S27, the save writing is performed, and then, the exchange processing is terminated. In the step S27, the CPU 20 updates the use identification data 402a such that it is identified that save data updated in the step S13 is the save data to be used.

Next, although exchange processing of the CPU 20 of the child apparatus will be described with using FIG. 11 and FIG. 12, the same or similar processing as the processing having been described in the exchange processing (FIG. 9 and FIG. 10) of the parent apparatus will be simply described.

As shown in FIG. 11, if the CPU 20 of the child apparatus starts the exchange processing, it is determined, in a step S51, whether the character data of the character X that is transmitted from the parent apparatus is received. If "NO" is determined in the step S51, the process returns to the step S51. On the other hand, if "YES" is determined in the step S51, the character data of the character Y is transmitted to the parent apparatus in a step S53.

In a subsequent step S55, the exchange confirmation screen 200 as shown in FIG. 4 is displayed on the display 36. Then, it is determined, in a step S57, whether the exchange is to be stopped. If "YES" is determined in the step S57, the exchange processing is terminated as shown in FIG. 12. On the other hand, if "NO" is determined in the step S57, it is determined, in a step S59, whether the exchange is to be performed. If "NO" is determined in the step S59, the process returns to the step S55. On the other hand, if "YES" is determined in the step S59, in a step S61, rarities of the character X and the character Y are compared with each other.

In a subsequent step S63, it is determined whether the notification of the preparation completion from the parent apparatus is received. If "NO" is determined in the step S63, the process returns to the step S63. On the other hand, if "YES" is determined in the step S63, as shown in FIG. 12, save data rewriting is prepared in a step S65. Then, it is determined, in a step S67, whether the rewriting preparation is completed.

If "NO" is determined in the step S67, the process returns to the step S65. On the other hand, if "YES" is determined in the step S67, the preparation completion is notified to the parent apparatus in a step S69. Subsequently, it is determined, in a step S71, whether the rareness value Ry is smaller than the rareness value Rx. If "YES" is determined in the step S71, that is, when the rareness value Ry is smaller than the rareness value Rx, it is determined that the rarity of the character Y is higher than the rarity of the character X, and writing start is notified to the parent apparatus in a step S73, and then, the process proceeds to a step S77. On the other hand, if "NO" is determined in the step S71, that is, if the rareness value Ry is equal to or larger than the rareness value Rx, it is determined that the rarity of the character Y is equal to or lower than the rarity of the character X, and it is determined, in a step S75, whether writing start from the parent apparatus is received.

If "NO" is determined in the step S75, that is, if not receiving the notification of writing start from the parent apparatus, the process returns to the step S75. On the other hand, if "YES" is determined in the step S75, the save writing is performed in a step S77, and then, the exchange processing is terminated.

According to this embodiment, since the game apparatus at a side that transmits the character data of the character having higher rarity instructs the save data writing to the game apparatus of the communication partner, in the game apparatus at a side that transmits the character data of the character having higher rarity, it is possible to shorten as much as possible a time period after a state where the save data becomes to be rewritable until the save data rewriting is ended. Therefore, it is possible to prevent illicit duplication of the character data.

In addition, in this embodiment, in order to exchange characters, based on the rarity (rareness value) that is decided according to an appearance probability of the character, the parent apparatus or the child apparatus notifies the writing start to the apparatus of the partner. If this rarity is considered from a viewpoint at a player side, it is possible to say that a character having higher rarity is a character hard to acquire by the player or a character worthy for the player. Therefore, the rarity can also be called a degree of valuableness.

Furthermore, although the game apparatus that performs the processing notifying the writing start is replaced between the parent apparatus and the child apparatus according to height of the rarity that is set for the character in this embodiment, the game apparatus that performs the processing notifying the writing start may be replaced between the parent apparatus and the child apparatus according to a parameter other than the rareness value.

For example, about a character that is delivered (distributed) specially in a theme park, a movie theater, an event site, etc., by making a parameter indicating that it is distributed specially be included in character data, it may be determined the character specifically distributed is higher than other character in a rarity or a degree of valuableness. Furthermore, about a character that is obtained by charging, by making a parameter indicating that it is obtained by charging be included in character data, it may be determined the character that is obtained by charging is higher than other character appearing in a game world without charging in a rarity or a degree of valuableness. Therefore, it is possible to prevent from being illicitly duplicated about not only a character that a frequency (probability) of appearance into the game world is low but also a character that is obtained by going to the theme park etc. or/and a character that is obtained by charging. Furthermore, the rarity or the degree of valuableness of a character to be exchanged may be determined with using both of the rareness value and a parameter other than the rareness value.

Furthermore, although the writing start is notified from the parent apparatus to the child apparatus even when the rareness value Rx and the rareness value Ry are equal to each other in this embodiment, in such a case, the writing start may be notified from the child apparatus to the parent apparatus.

Furthermore, although the character data about a character that the player or player character owns is exchanged in this embodiment, character data may be data about items such as a weapon, a tool, food, etc. that the player or player character owns.

Furthermore, although the character about a game is exchanged in this embodiment, in an application other than the game, data about a tool etc. used in the application may be exchanged.

Furthermore, although the rareness value is made to be included in the character data in this embodiment, it does not need to be limited to this. A table that describes the rareness value corresponding to the data (character name, for example) included in the character data of each character, the rareness value may be read from this table.

Furthermore, the character data is transmitted from the child apparatus to the parent apparatus after transmitting the character data to the child apparatus from the parent apparatus in this embodiment, and the child apparatus notifies the parent apparatus that the rewriting preparation is completed after the parent apparatus notifies the child apparatus that the rewriting preparation is completed, but it does not need to be limited to this. The character data may be transmitted from the parent apparatus to the child apparatus after transmitting the character data to the parent apparatus from the child apparatus, and the parent apparatus may notify the child apparatus that the rewriting preparation is completed after the child apparatus notifies the parent apparatus that the rewriting preparation is completed. Furthermore, if each of the parent apparatus and the child apparatus performs rewriting preparation after ending transmission and reception of the character data, at the time that the rewriting preparation is completed, the notification of the rewriting preparation completion can be transmitted to the apparatus of the partner.

In addition, although this embodiment is described about a case where a portable game apparatus is used, it is needless to say that the present embodiment is applicable also to other apparatus such as a stationary game apparatus, a desktop PC, an arcade game apparatus, etc. Furthermore, it is possible to also apply the present embodiment to other apparatus such as a notebook PC, PDA, a mobile phone, a smartphone, a tablet PC, etc.

It should be noted that the specific numerical values described in the above-described embodiments are only examples, and to be set appropriately in accordance with the actual products.

Furthermore, when the same or similar effect (result) is acquired, an order of the steps shown in the flowchart may be changed suitably. For example, the step S11 may be executed after the step S9 and before the step S21. Similarly, the step S61 may be executed after the step S59 and before the step S71.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A data exchange system for exchanging object data for first and second game objects having different values, the data exchange system comprising:
    a first game apparatus comprising first communication circuitry, first storage, and a first processor; and
    a second game apparatus comprising second communication circuitry, second storage, and a second processor, wherein
    the first processor is configured to control to transmit, to the second game apparatus, via the first communication circuitry, first object data for the first game object; and control to receive, from the second game apparatus, via the first communication circuitry, second object data for the second game object;
    the second processor is configured to control to transmit, to the first game apparatus, via the second communication circuitry, the second object data; and control to receive, from the first game apparatus, via the second communication circuitry, the first object data;
    each of the first processor and the second processor is configured to compare the values of the first and second game objects;
    the first processor is configured to control to transmit, to the second game apparatus, a first writing start notification for providing notification of a start of writing to the first storage by the first game apparatus of second identification information for identifying the second object data for use by the first game apparatus;
    the second processor is configured to control to transmit, to the first game apparatus, a second writing start notification for providing notification of a start of writing to the second storage by the second game apparatus of first identification information for identifying the first object data for use by the second game apparatus;
    the first processor is configured to, based on determining by the comparing that the value of the second game object is less than the value of the first game object, control to start writing the second identification information to the first storage without receiving the second writing start notification from the second apparatus so that the writing of the second identification information to the first storage is completed before writing of the first identification information to the second storage is completed, thereby reducing a time period during which the first game object can be illicitly duplicated in the first and second storages; and, based on determining by the comparing that the value of the second game object is greater than the value of the first game object, control to start writing the second identification information to the first storage when the second writing start notification is received from the second game apparatus so that the writing of the first identification information to the second storage is completed before the writing of the second identification information to she first storage is completed, thereby reducing a time period during which the second game object can be illicitly duplicated in the first and second storages; and the second processor is configured to, based on determining by the comparing that the value of the second game object is less than the value of the first game object, control to start writing the first identification information to the second storage when the first writing start notification is received from the first game apparatus so that the writing of the second identification information to the first storage is completed before the writing of the first identification information to the second storage is completed, thereby reducing a time period during which the first game object can be illicitly duplicated in the first and second storages; and, based on determining by the comparing that the value of the second game object is greater than the value of the first game object, control to start writing the first identification information to the second storage without receiving the first writing start notification from the first game apparatus so that the writing of the first identification information to the second storage is completed before the writing of the second identification information to the first storage, thereby reducing a time period during which the second game object can be illicitly duplicated in the first and second storages.

2. The data exchange system according to claim 1, wherein each of the first storage and the second storage comprises nonvolatile storage, the first storage is configured to store first after-exchange save data including the received second object data in addition to first before-exchange save data including the first object data, and the second storage is configured to store second after-exchange save data including the received first object data in addition to second before-exchange save data including the second object data.

3. The data exchange system according to claim 2, wherein the second identification information indicates the first after-exchange save data for use as between the first after-exchange save data and the first before-exchange save data, and first identification information indicates the second after-exchange save data for use as between the second after-exchange save data and the second before-exchange save data.

4. The data exchange system according to claim 1, wherein the first object data includes first value data indicating the value of the first game object, and the second object data includes second value data indicating the value of the second game object.

5. The data exchange system according to claim 1, wherein the first and second communication circuitry are each configured for wireless communication.

6. The data exchange system according to claim 1, wherein the first and second communication circuitry are each configured for Internet communication.

7. A game apparatus for exchanging object data for first and second game objects having different values with another game apparatus, the information processing apparatus comprising:

communication circuitry;

storage; and a processor configured to:

control to transmit, to the other game apparatus, via the communication circuitry, first object data for the first game object;

control to receive, from the other game apparatus, via the communication circuitry, second object data for the second game object;

compare the values of the first and second game objects;

control to transmit, to the other game apparatus, a first writing start notification for providing notification of a start of writing to the storage by the game apparatus of second identification information for identifying the second object data for use by the first game apparatus;

control to receive, from the other game apparatus, a second writing start notification for providing notification of a start of writing by the other game apparatus of first identification information for identifying the first object data for use by the other game apparatus;

based on determining by the comparing that the value of the second game object is less than the value of the first game object, control to start writing the second identification information to the storage without receiving the second writing start notification from the other game apparatus so that the writing of the second identification information to the storage is completed before writing of the first identification information to storage of the other game apparatus is completed, thereby reducing a time period during which the first game object can be illicitly duplicated in the storage of the game apparatus and the storage of the other game apparatus; and, based on determining by the comparing that the value of the second game object is greater than the value of the first game object, control to start writing the second identification information to the storage when the second writing start notification is received from the other game apparatus so that the writing of the first identification information to the storage of the other game apparatus is completed before the writing of the second identification information to the storage of the game apparatus is complete, thereby reducing a time period during which the second game object can be illicitly duplicated in the storage of the game apparatus and the storage of the other game apparatus.

8. The information processing apparatus according to claim 7, wherein the storage comprises nonvolatile storage configured to store after-exchange save data including the received second object data in addition to before-exchange save data including the first object data, and the second identification information indicates the after-exchange save data for use as between the after-exchange save data and the before-exchange save data.

9. A non-transitory computer-readable storage medium storing a data exchange program which, when executed by a computer of a game apparatus for exchanging object data for first and second game objects having different values with another game apparatus, controls the information processing apparatus to perform operations comprising:
- control to transmit, to the other game apparatus, first object data for the first game object;
- control to receive, from the other game apparatus, second object data for the second game object;
- compare the values of the first and second game objects;
- transmit, to the other game apparatus, a first writing start notification for providing notification of a start of writing to the storage by the game apparatus of second identification information for identifying the second object data for use by the first game apparatus;
- receive, from the other game apparatus, a second writing start notification for providing notification of a start of writing by the other game apparatus of first identification information for identifying the first object data for use by the other game apparatus;
- based on determining by the comparing that the value of the second game object is less than the value of the first game object, start writing the second identification information to the storage without receiving the second writing start notification from the other game apparatus so that the writing of the second identification information to the storage is completed before writing of the first identification information to storage of the other game apparatus in completed, thereby reducing a time period during which the first game object can be illicitly duplicated in the storage of the same apparatus and the storage of she other came apparatus; and
- based on determining by the comparing that the value of the second game object is greater than the value of the first game object, control to start writing the second identification information to the storage when the second writing start notification is received from the other game apparatus so that the writing of the first identification information to the storage of the other game apparatus is completed before the writing of the second identification information to the storage of the game apparatus is completed, thereby reducing a time period during which the second game object can be illicitly duplicated in the storage of the game apparatus and the storage of the other game apparatus.

10. The non-transitory computer-readable storage medium according to claim 9, wherein the storage comprises nonvolatile storage configured to store after-exchange save data including the received second object data in addition to before- exchange save data including the first object data, and
- the second identification information indicates the after-exchange save data for use as between the after-exchange save data and the before-exchange save data.

11. A data exchange method for a game apparatus for exchanging object data for first and second game objects having different values with another game apparatus, the method comprising:
- transmitting, to the other game apparatus, first object data for the first game object;
- receiving, from the other game apparatus, second object data for the second game object;
- comparing the values of the first and second game objects;
- transmitting, to the other game apparatus, a first writing start notification for providing notification of a start of writing to the storage by the game apparatus of second identification information for identifying the second object data for use by the first game apparatus;
- receiving, from the other game apparatus, a second writing start notification for providing notification of a start of writing by the other game apparatus of first identification information for identifying the first object data for use by the other game apparatus; and
- based on determining by the comparing that the value of the second game object is less than the value of the first game object, starting writing of the second identification information to the storage without receiving the second writing start notification from the other game apparatus so that the writing of the second identification information to the storage is completed before writing of the first identification information to storage of the other game apparatus is completed, thereby reducing a time period during which the first game object can be illicitly duplicated in the storage of the game apparatus and the storage of the other game apparatus; and
- based on determining by the comparing that the value of the second game object is greater than the value of the first game object, starting writing of the second identification information to the storage when the second writing start notification is received so that the writing of the first identification information to the storage of the other game apparatus is completed before the writing of the second identification information to the storage of the game apparatus is complete, thereby reducing a time period during which the second game object can be illicitly duplicated in the storage of the game apparatus and the storage of the other game apparatus.

12. The method according to claim 11, wherein the storage comprises nonvolatile storage configured to store after-exchange save data including the received second object data in addition to before-exchange save data including the first object data, and
- the second identification information indicates the after-exchange save data for use as between the after-exchange save data and the before-exchange save data.

* * * * *